United States Patent [19]
Taylor et al.

[11] Patent Number: 6,025,591
[45] Date of Patent: Feb. 15, 2000

[54] QUADRUPOLE MASS SPECTROMETERS

[75] Inventors: Stephen Taylor, Wavertree; Thomas Tate, Maidstone; Richard Syms, Ealing; Howard Dorey, Godalming, all of United Kingdom

[73] Assignee: University of Liverpool, Liverpool, United Kingdom

[21] Appl. No.: 08/939,725
[22] PCT Filed: Apr. 3, 1996
[86] PCT No.: PCT/GB96/00810
§ 371 Date: Feb. 17, 1998
§ 102(e) Date: Feb. 17, 1998
[87] PCT Pub. No.: WO96/31901
PCT Pub. Date: Oct. 10, 1996

[30] Foreign Application Priority Data

Apr. 4, 1995 [GB] United Kingdom .................. 9506972

[51] Int. Cl.⁷ .................................................. H01J 49/42
[52] U.S. Cl. ............................................................ 250/292
[58] Field of Search ................................................ 290/292

[56] References Cited

U.S. PATENT DOCUMENTS

| | | | |
|---|---|---|---|
| 3,699,330 | 10/1972 | McGinnis | 250/292 |
| 4,985,626 | 1/1991 | Margulies | 250/292 |
| 5,373,157 | 12/1994 | Hiroki et al. | 250/292 |
| 5,401,962 | 3/1995 | Ferran | 250/292 |
| 5,719,393 | 2/1998 | Chutjian et al. | 250/292 |

FOREIGN PATENT DOCUMENTS 9406059 5/1994 WIPO ........................................ 59/44

*Primary Examiner*—Jack I. Berman
*Attorney, Agent, or Firm*—Craig J. Lervick

[57] ABSTRACT

A quadrupole mass spectrometer comprises an ion source (20), a mass filter (22) and an ion collector (24). The ion source comprises an array (30) of quantum wires. The mass filter comprises four glass fibres (32) coated with nickel and the ion collector is an a electrode connected to an integrated complementary metal oxide semiconductor temperature compensated integrated amplifier.

30 Claims, 4 Drawing Sheets

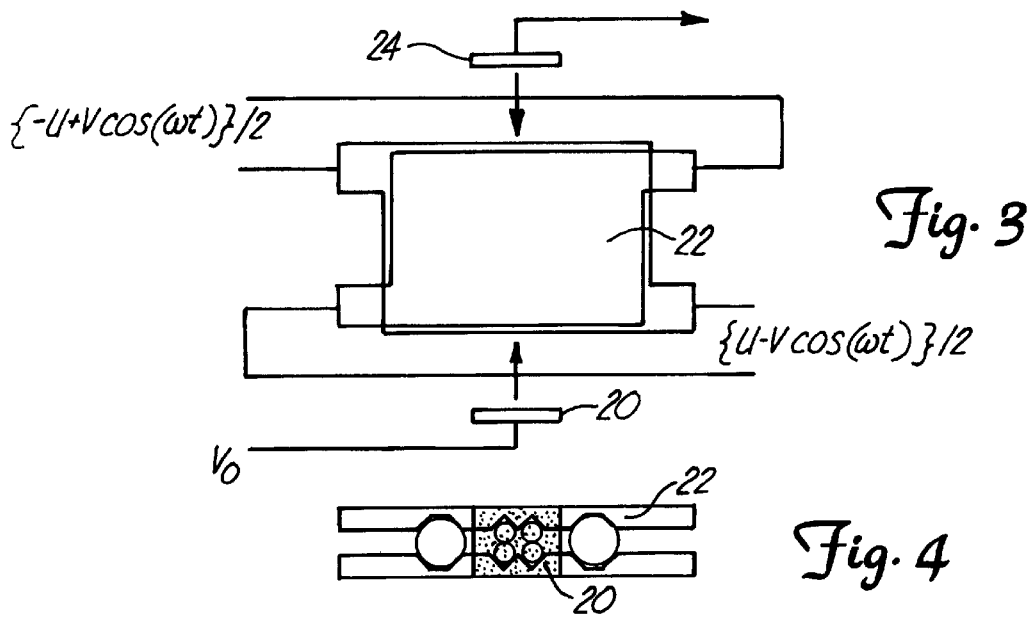
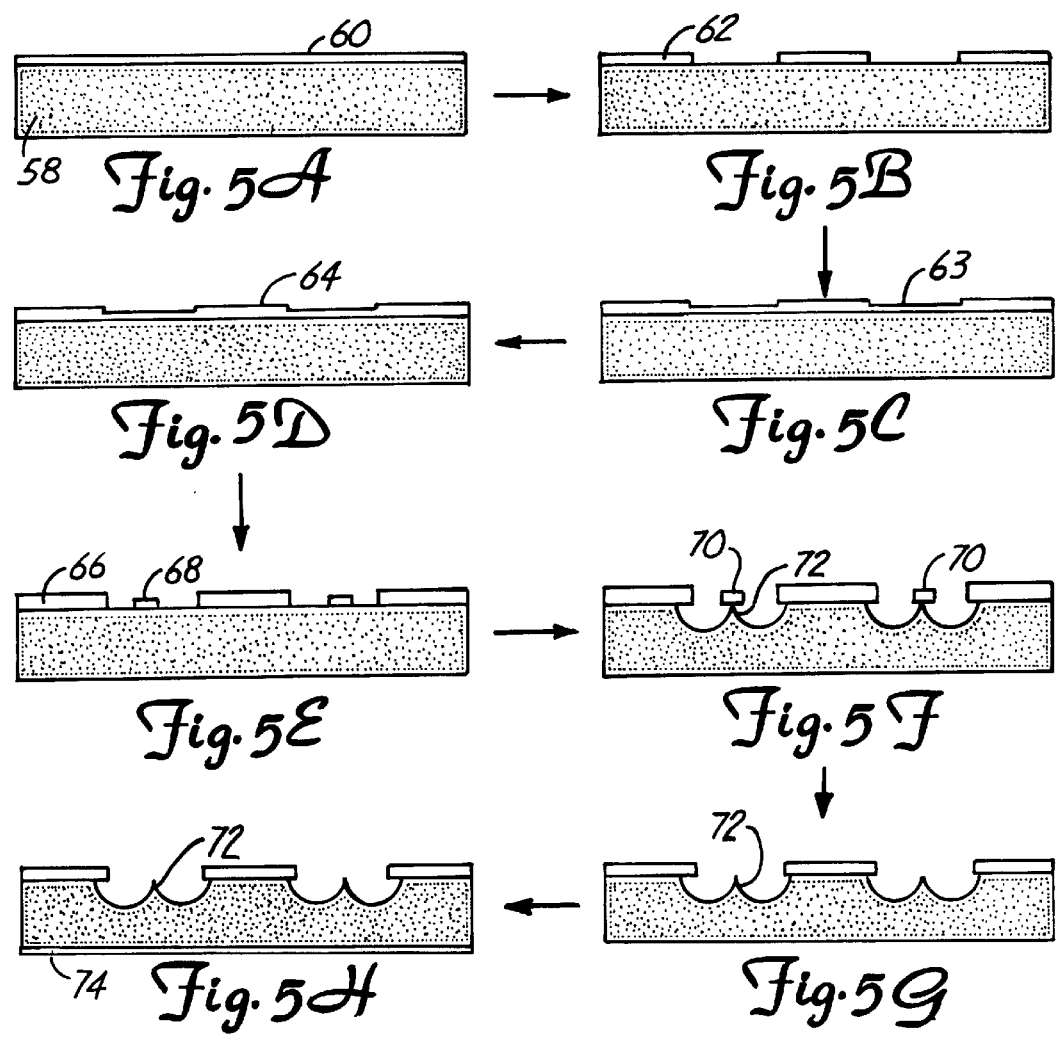

QUADRUPOLE MASS SPECTROMETERS

DESCRIPTION

This invention concerns improvements in and relating to quadrupole mass spectrometers.

Quadrupole mass spectrometers may be used for residual gas analysis in the semiconductor industry, typically to determine gases present after processing, in order to ensure a clean chamber. Quadrupole mass spectrometers may also be used in chemical processes to detect presence of toxic gases.

A quadrupole mass spectrometer generally comprises an ion source, a mass filter and an ion detector. Conventionally circular section metal rods are used as the mass filter by being excited electrically. This electrical excitement produces a field that can be controlled to permit only ionised particles of interest to reach the ion detector, enabling their detection.

These spectrometers are generally expensive to purchase and to repair and recalibrate. There exists, therefore, a need for a low cost quadrupole mass spectrometer. Furthermore, size is a factor in determining where quadrupole mass spectrometers are used. Miniaturization of quadrupole mass spectrometers without compromising resolution is also desirable.

An object of this invention is to provide a quadrupole mass spectrometer which may be manufactured to be smaller than hitherto and at lower cost.

According to this invention there is provided a quadrupole mass spectrometer comprising a mass filter and an ion detector, characterized in that the mass filter comprises a plurality of metal coated fibres.

For many applications the quadrupole mass spectrometer of the invention will require an ion source but the quadrupole mass spectrometer may also be used in environments were ions are already generated.

The ion source preferably comprises an array of field emitters, such as tips or edges. In one preferred form the ion source comprises an array of relatively sharp tips which may be formed in a semiconductor material, such as silicon or gallium arsenide, or in a metal. The number of tips forming an array may be from 1 to 100,000, preferably around 10,000 over an area of about 0.25 $mm^2$. The ion source emits electrons from said tips causing ionisation, by application of a negative potential thereto, of gas atoms or molecules in the vicinity thereof either by attachment (forming negative species) or by collision with the atoms or molecules (forming positive species).

In another preferred form the ion source comprises an array of relatively sharp edges which again may be formed in semiconductor material possibly in a similar fashion.

The ion source is preferably formed from a silicon wafer by depositing and etching oxide and metal layers to a desired pattern before isotropically etching substrate material to form ion emitter tips or edges. The oxide is preferably formed in a first layer before etching to remove oxide in discrete areas and then formed in a second layer whereby oxide thickness in those discrete areas is thinner than elsewhere. After metallisation of the oxide layer, etching may be used to remove oxide from said thinner areas but leaving mask pads for the emitter tips or edges to protect them during isotropic etching to form them. The subsequent isotropic etching of the substrate leaves emitter tips or edges protected by said mask pads which are then removed. Finally, the opposite side of the substrate is treated to provide one electrical contact i.e. by metallisation, the other electrical contact being made to the metal layer previously deposited on top of the oxide layer. This upper metal layer will normally be connected to ground or near ground potential e.g. 0 to 10V and the lower metal layer will be connected to a suitable negative potential, e.g. −40V.

The ion source may be arranged to emit electrons generally in the direction of a longitudinal axis of the quadrupole mass spectrometer. However, it is also possible to arrange for the ion source or a pair of facing ion sources to emit electrons transverse to the said axis. With these and in other ion source arrangements it may be advantageous to provide means for focussing produced ions in the direction of the mass filter.

The mass filter may be made of any suitable fibres, such as glass or plastics fibre, that are metal coated, such as with nickel.

The mass filter is preferably made from four metallised e.g. nickel coated, glass fibres, preferably of about 0.5 mm diameter, in two pairs. For some applications it may be advantageous for the mass filter to comprise more than one set of four metallised fibres. Each pair of fibres is connected to a different potential source. Preferably from an end view each fibre is at a corner of a rectangle and the fibres of each pair are diagonally opposed. The fibres are preferably mounted in a sandwich of single crystal semiconductor wafers, for example of silicon, gallium arsenide, silicon germanium, silicon carbide, germanium or indium phosphide. These wafers preferably have grooves, especially v-section grooves, therein to locate the fibres two in each wafer, so that in the sandwich one fibre overlies another fibre in a parallel relationship. The wafers may be further grooved to provide locations for spacers, which may themselves be glass fibres.

The grooves in the wafers may be formed by etching and the mass filter fibres may be fusion bonded on the grooves. Once the fibres are in position means for electrically connecting them may be provided by means of a metal coating. The wafers may include tabs onto which said metal coating extends from a fibre to facilitate said electrical connection.

According to another aspect of the invention there is provided a method of forming a mass filter for a quadrupole mass spectrometer characterized by the steps of etching a pair of silicon wafers each to form grooves to receive a pair of metal coated fibres, bonding the fibres on the grooves, forming a metal coating on each wafer for electrical connection to the fibres and arranging the wafers in spaced relationship with one pair of fibres overlying the other.

The ion detector is preferably an electrometer and especially comprises an electrode which acts as an ion collector (capacitor plate). The electrode is preferably connected to a temperature compensated integrated amplifier fabricated using p- and n- channel MOS transistors (CMOS).

Quadrupole mass spectrometers according to the invention may be operated in the same manner as conventional spectrometers. However, its component parts may be miniaturized to produce a smaller QMS than hitherto possibly by a factor of 10 or more. This means that a QMS of the invention may have many more applications because of its smaller size and operating voltages may be reduced allowing battery operation.

As with a conventional QMS ions are produced either externally or by its own ion source to ionise gas particles. These ionised gas particles travel towards the detector through the mass filter. The mass filter fibres are electrically excited by means of a combination of alternating and direct voltages to produce a variable field from the detector which can be used to focus ionised gas particles onto the detector, which measures the charge collected or the current carried by the ions, from which pressure of gases can be determined.

This invention will now be further described, by way of example only, with reference to the accompanying drawings, in, which:

FIG. 3 shows schematically a plan view of the quadrupole mass spectrometer of FIG. 2;

FIG. 4 shows schematically from one end the quadrupole mass spectrometer of FIG. 2;

FIGS. 5A to 5H shows a sequence of steps for manufacturing a field emitter array for the spectrometer of FIG. 2;

Figure 1:
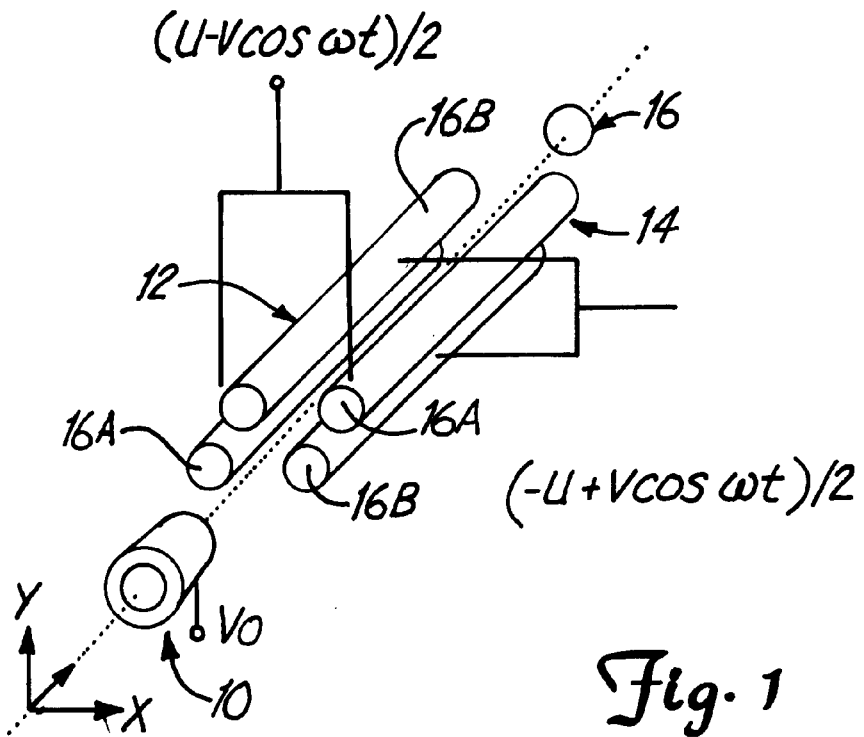
FIG. 1 show schematically a prior art quadrupole mass spectrometer.

Referring to FIG. 1 of the accompanying drawings, a prior art quadrupole mass spectrometer comprises an ion source 10, a mass filter 12 and an ion detector 14. The mass filter 12 comprises two pairs of metal rods 16A and 16B arranged at four corners of a square with each rod of a pair being diagonally opposed to the other. Each pair of rods has an alternating voltage (V) applied thereto and a direct voltage (U) applied thereto to produce a variable field. In use ionised gas particles travel between the rods to the detector. The voltages applied to the metal rods are chosen to focus ions onto the detector i.e. to act as a filter. The detector measures the number of charged particles incident upon it.

Figure 2:
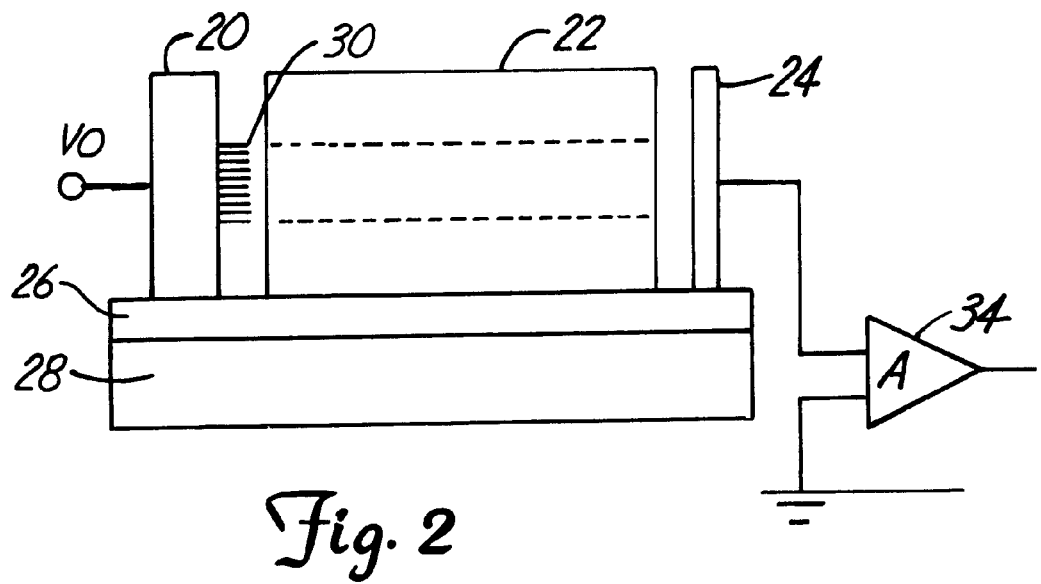
FIG. 2 shows schematically from one side a quadrupole mass spectrometer according to the invention.

Turning to FIGS. 2 to 4 of the accompanying drawings, a quadrupole mass spectrometer according to the invention comprises an ion source 20, a mass filter 22 and an ion collector plate 24. The ion source, mass filter and ion collector are mounted on an insulating layer 26 which may be of silicon dioxide on a suitable substrate 28. The ion source 20 is connected to a voltage source and comprises an array 30 of quantum wires covering an area of approximately 0.5×0.5 mm. Tips of the quantum wires 30 are approximately 10 μm from the mass filter 22.

The mass filter 22 comprises four circular section glass fibre rods 32 coated with nickel or other suitable metal, which have a diameter of approximately 0.5 mm and a length of approximately 5 mm. The ion collector 24 is a suitable electrode connected to an integrated complementary metal oxide semiconductor (comprising both p and n channel transistors) temperature compensated integrated amplifier positioned about 10 μm from the end of the mass filter 22.

The ion source 20 is based on an array of sharp tips 30 (quantum wires) which act as electron emitters to ionise residual gases in their immediate vicinity. The tips are formed from a silicon substrate 58 by isotropic etching as shown in FIGS. 5A to H. A first thick layer of oxide 60 is formed on a silicon wafer and then etched to leave isolated areas of oxide 62. A further thinner layer 63 of oxide is formed on the wafer so that the spaces between said areas 62 are filled but not to the same height. A layer of metal 64 is then applied to the wafer and the wafer again etched to leave isolated larger areas of metal coated oxide 66 and smaller isolated areas 68. The smaller areas are in the region of lesser height and form ion emitter mask pads 70.

Using isotropic etching substrate material is removed to form emitter tips 72 protected by the mask pads 70. These pads 70 are then stripped off to leave the emitter tips 72. Finally, the underside of the substrate is also metallised 74.

In use a negative potential e.g. about −40V will be applied to the metal layer 74 and the upper metal layer 64 connected to ground, in order to generate electrons from the wire tips.

Figure 6B:
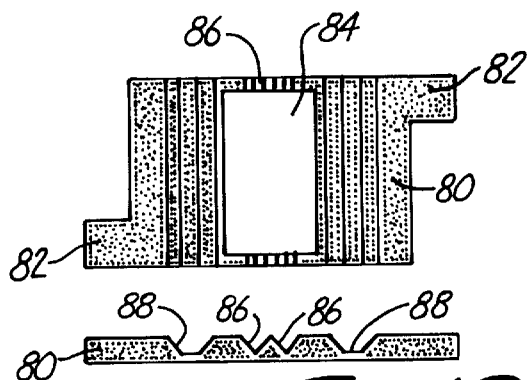
FIGS. 6A to 6F show a sequence of steps for manufacturing a mass filter for the spectrometer of FIG. 2.
Figure 6A:
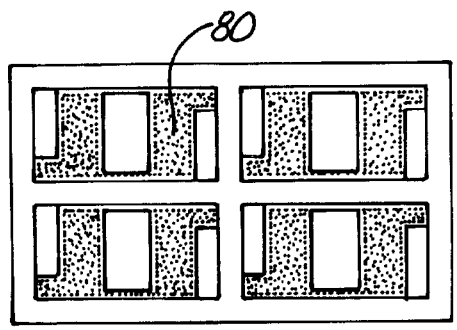
Figure 6C:
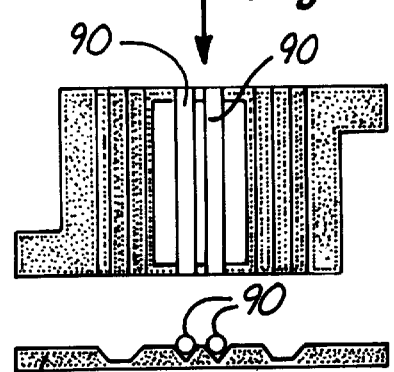
Figure 6D:
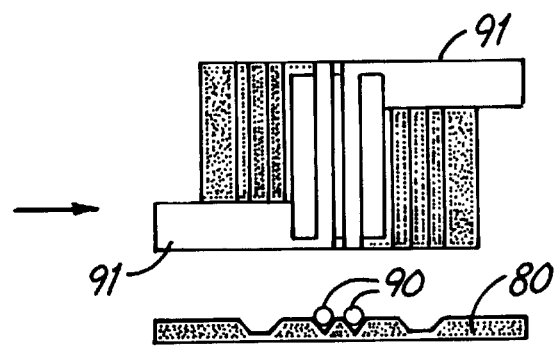

The mass filter is based on batch fabricated self-aligning structures. A typical batch layout is shown in FIG. 6A. Silicon wafers 80 are etched to define the dies shown i.e. as rectangles with rectangular tabs 82 extending from each of one pair of diagonally opposed corners. The silicon wafers 80 are patterned and wet etched to form substrates with v-groove alignment features and a central rectangular aperture 84 whose longer sides are parallel to each of the shorter sides of the individual silicon dies. Each wafer has one pair of parallel closely spaced smaller section grooves 86 in the shorter direction of the rectangle, so that, in fact, these grooves are interrupted by the aperture 84. A second pair of larger section grooves 88 are also formed, one of each pair being outside the grooves 86.

The surface mask used for etching is then removed and the wafer is re-oxidised forming an insulating layer. Two mass filter electrodes, namely nickel coated glass fibres 90, are fusion bonded into the smaller grooves 86 of each substrate. These fibres are of circular cross section but may be of other suitable cross sections, e.g. hyperbolic.

Figure 6F:
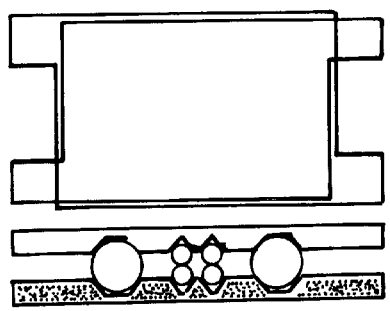
Figure 6E:
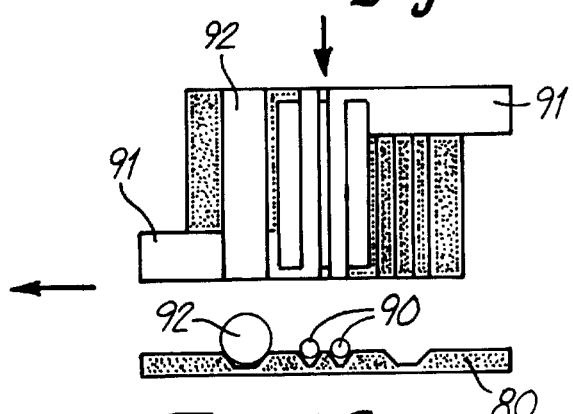

The substrate is metallised by sputtering and the conformal metal coating 91 is patterned and etched so that each fibre 90 is connected to its adjacent tab 82 where an electrical connection can be made via a contact pad. Next a larger section alignment fibre 92 is bonded into one of the larger grooves 88. The wafer is finally diced and a pair of substrates assembled together one on top of the other sandwiching the fibres between them as shown in FIG. 6F.

Figure 7:
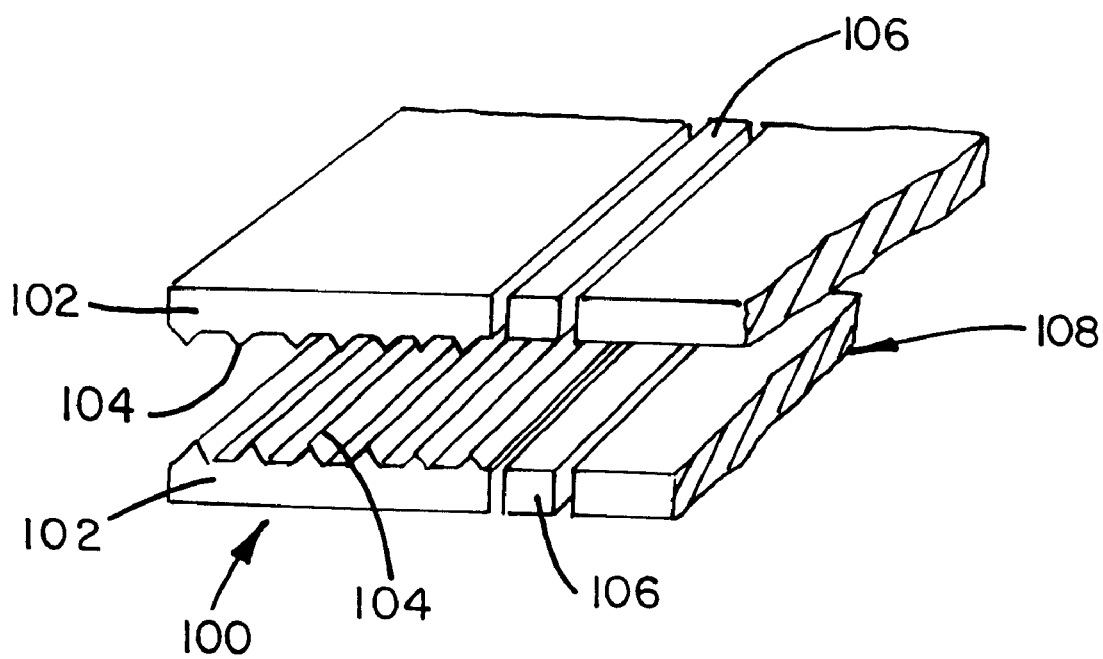
FIG. 7 shows schematically another form of quadrupole mass spectrometer according to the invention.

Finally, FIG. 7 of the accompanying drawings shows schematically another form of quadrupole mass spectrometer according to the invention, which has features that may also be applicable to the other illustrated embodiment.

Instead of the ion source 100 being an array of emitter points or quantum wires, it has a pair of facing arrays 102 of sharp edges 104 acting as ion emitters. Each array may be made in a similar fashion to the ion emitter source 20 as illustrated in FIG. 5 of the drawings.

The gases to be ionized are bombarded with electrons travelling transversely. Therefore, it is desirable to having a means 106 for focussing the ions in the direction of the mass filter 108. Thus, the means 106 is positioned between the ion emitter and the mass filter and is oppositely charged to the charge of the gas ions, so that they are attracted in that direction.

The provision of such focussing means is generally useful whatever the ion emitter source arrangement. In other embodiments the focussing means may be in the form of a ring. The mass filter in this embodiment is only indicated generally and may be the same as described for the embodiment of FIGS. 2 to 4.

It is envisaged that a quadrupole mass spectrometer according to the invention may be made to be considerably smaller than a conventional QMS. The following Table 1 is a comparison of typical dimensions, manufacturing tolerances, operating voltages and frequencies for a conventional QMS and a micromachined QMS according to the invention.

TABLE 1

|  | Vo | F | Length | Rod Dia | Tolerance |
|---|---|---|---|---|---|
| Conventional QMS | 1000V | 2 MHZ | 50 mm | 5 mm | 25 um |
| Micromachined QMS | <20V | 20 MHZ | 5 mm | 0.5 mm | 2 um |

As can be seen from Table 1 miniaturization confers the advantage that operating voltages may be scaled down allowing lower power (e.g. battery) operation. The circuits for the RF electronics driving the mass filter and both the ion source and ion detector may also be realised using conventional CMOS technology and located on a chip alongside these items. Another advantage of miniaturisation is that the operating pressure range of the QMS may be increased, since the mean free path of the gas molecules to be analysed is scaled up by the same factor as the QMS dimensions are scaled down. Both of these advantages increase the range of applications suitable for a QMS of the invention.

We claim:

1. A quadrupole mass spectrometer comprising a mass filter and an ion detector, wherein the mass filter comprises a plurality of metal coated fibres.

2. A quadrupole mass spectrometer as claimed in claim 1 further comprising an ion source.

3. A quadrupole mass spectrometer as claimed in claim 1, wherein the mass filter comprises fibres selected from the group consisting of glass and plastics fibres.

4. A quadrupole mass spectrometer as claimed in claim 1, wherein the mass filter comprises at least one set of four metal coated fibres in pairs.

5. A quadrupole mass spectrometer as claimed in claim 4, wherein the mass filter comprises one set of four metal coated fibres in two pairs.

6. A quadrupole mass spectrometer as claimed in claim 4, wherein the mass filter comprises more than one set of four metal coated fibres in pairs.

7. A quadrupole mass spectrometer as claimed in claim 1, wherein the mass filter fibres are coated with nickel.

8. A quadrupole mass spectrometer as claimed in claim 4, wherein each pair of fibres is connected to a different potential source.

9. A quadrupole mass spectrometer as claimed in claim 4, wherein from an end view each fibre is at a corner of a rectangle.

10. A quadrupole mass spectrometer as claimed in claim 4, wherein the fibres of each pair are diagonally opposed.

11. A quadrupole mass spectrometer as claimed in claim 1, wherein the fibres are mounted in a sandwich of single crystal semiconductor wafers.

12. A quadrupole mass spectrometer as claimed in claim 11, wherein the single crystal semiconductor wafers are of a material selected from the group consisting of silicon, gallium arsenide, silicon germanium, silicon carbide, germanium and indium phosphide.

13. A quadrupole mass spectrometer as claimed in claim 11, wherein the wafers have grooves therein to locate the fibres, two in each wafer, so that in the sandwich one fibre overlies another.

14. A quadrupole mass spectrometer as claimed in claim 11, wherein spacers are provided between the wafers.

15. A quadrupole mass spectrometer as claimed in claim 11, wherein spacers are provided in grooves between the wafers, the grooves being formed by etching and the mass filter fibres being fusion bonded on the grooves.

16. A quadrupole mass spectrometer as claimed in claim 11, wherein spacers comprising glass fibres are provided between the wafers.

17. A quadrupole mass spectrometer as claimed in claim 11, wherein metal coatings are provided on the wafers for forming electrical connections to the mass filter fibres.

18. A quadrupole mass spectrometer as claimed in claim 1, wherein the ion detector is an electrometer.

19. A quadrupole mass spectrometer as claimed in claim 1, wherein the ion detector comprises an electrode which acts as an ion collector.

20. A quadrupole mass spectrometer as claimed in claim 19, wherein the electrode is connected to a temperature compensated integrated amplifier fabricated using p- and n-channel MOS transistors.

21. A quadrupole mass spectrometer as claimed in claim 1, further comprising an ion source of an array of field emitters.

22. A quadrupole mass spectrometer as claimed in claim 21, wherein the ion source comprises an array of field emitter points.

23. A quadrupole mass spectrometer as claimed in claim 21, wherein the ion source comprises an array of field emitter edges.

24. A quadrupole mass spectrometer as claimed in claim 1, wherein the ion source comprises an array of sharp tips and edges formed in a material selected from the group consisting of semiconductors and metals.

25. A quadrupole mass spectrometer as claimed in claim 24, wherein the semiconductor material is selected from the group consisting of silicon and gallium arsenide.

26. A quadrupole mass spectrometer comprising a mass filter, an ion detector and an ion source, characterized in that the mass filter comprises a plurality of metal coated fibres and the ion source is formed from a silicon wafer by depositing and etching oxide and metal layers to a desired pattern before isotropically etching substrate material to form ion emitter tips or edges.

27. A quadrupole mass spectrometer as claimed in claim 26, wherein forming of the ion source includes the steps of forming oxide in a first layer before etching to remove oxide in discrete areas and then forming oxide in a second layer, whereby oxide thickness in those discrete areas is thinner than elsewhere.

28. A quadrupole mass spectrometer as claimed in claim 27, wherein forming of the ion source includes the further steps of metallising the oxide layer, etching to remove oxide from said thinner areas but leaving mask pads for the emitter tips or edges to protect them during isotropic etching to form them.

29. A quadrupole mass spectrometer as claimed in claim 26, wherein the ion source has a metal layer on its other side for electrical connection thereto.

30. A method of forming a mass filter for a quadrupole mass spectrometer comprising the steps of etching a pair of silicon wafers each to form grooves to receive a pair of metal coated fibres, bonding the fibres on the grooves, forming a metal coating on each wafer for electrical connection to the fibres and arranging the wafers in spaced relationship with one pair of fibres overlying the other.

* * * * *